(12) United States Patent
Sewall et al.

(10) Patent No.: US 8,644,272 B2
(45) Date of Patent: Feb. 4, 2014

(54) INITIATING ROUTER FUNCTIONS

(75) Inventors: Patrick Sewall, Boise, ID (US); David Alan Johnson, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 1157 days.

(21) Appl. No.: 12/172,862

(22) Filed: Jul. 14, 2008

(65) Prior Publication Data

US 2008/0310407 A1    Dec. 18, 2008

Related U.S. Application Data (63) Continuation-in-part of application No. 11/673,956, filed on Feb. 12, 2007.

(60) Provisional application No. 60/949,582, filed on Jul. 13, 2007, provisional application No. 60/949,585, filed on Jul. 13, 2007.

(51) Int. Cl.
*H04W 4/00* (2009.01)
*H04L 12/28* (2006.01)
*H04L 12/56* (2011.01)

(52) U.S. Cl.
USPC ......................................... 370/338; 370/401

(58) Field of Classification Search
None
See application file for complete search history.

(56) References Cited

U.S. PATENT DOCUMENTS

| | | | |
|---|---|---|---|
| 5,231,633 A | 7/1993 | Hluchyj et al. | |
| 5,594,946 A | 1/1997 | Menich et al. | |
| 5,638,359 A | 6/1997 | Peltola et al. | |
| 5,859,628 A | 1/1999 | Ross et al. | |
| 5,864,539 A | 1/1999 | Yin | |
| 6,006,034 A | 12/1999 | Heath et al. | |
| 6,006,264 A | 12/1999 | Colby et al. | |
| 6,028,848 A | 2/2000 | Bhatia et al. | |
| 6,031,844 A | 2/2000 | Lin | |
| 6,377,825 B1 | 4/2002 | Kennedy et al. | |
| 6,389,462 B1 | 5/2002 | Cohen et al. | |
| 6,434,187 B1 | 8/2002 | Beard et al. | |
| 6,535,592 B1 | 3/2003 | Snelgrove | |
| 6,553,028 B1 | 4/2003 | Tang | |
| 6,560,442 B1 | 5/2003 | Yost et al. | |

(Continued)

FOREIGN PATENT DOCUMENTS

| | | |
|---|---|---|
| EP | 1331784 A1 | 7/2003 |
| JP | 20010186565 | 7/2001 |
| KR | 20040028099 | 4/2004 |

OTHER PUBLICATIONS

International Search Report & Written Opinion of the International Searching Authority for Application No. PCT/US07/62079, mailed Nov. 8, 2007.

(Continued)

*Primary Examiner* — Suk Jin Kang
(74) *Attorney, Agent, or Firm* — Parsons Behle & Latimer (57) ABSTRACT

A method of initiating router functions includes providing a router device having an integrated user interface having a user control and an indicator. From the router device, a first data link to a wide area network is established. From the router device, a second data link to enable a local area network is established. Via the indicator, state information regarding the first and second data links is communicated. It is determined if the user control has been activated. Upon detecting that the user control has been activated one or both of the first and second data links are modified. Information indicating the modification is communicated via the indicator.

25 Claims, 7 Drawing Sheets

(56) References Cited

U.S. PATENT DOCUMENTS

| | | |
|---|---|---|
| 6,609,197 B1 | 8/2003 | Ketcham et al. |
| 6,611,861 B1 | 8/2003 | Schairer et al. |
| 6,615,262 B2 | 9/2003 | Schweitzer et al. |
| 6,621,798 B1 | 9/2003 | Krishnan et al. |
| 6,735,447 B1 | 5/2004 | Muller |
| 6,795,700 B2 | 9/2004 | Karaoguz et al. |
| 6,850,495 B1 | 2/2005 | Baum et al. |
| 6,862,444 B2 | 3/2005 | Karaoguz et al. |
| 6,885,859 B2 | 4/2005 | Karaoguz et al. |
| 6,967,958 B2 | 11/2005 | Ono et al. |
| 6,987,726 B1 | 1/2006 | Elliott |
| 7,009,941 B1 | 3/2006 | Uchino |
| 7,095,335 B2 | 8/2006 | De Bolster et al. |
| 7,187,923 B2 | 3/2007 | Mousseau et al. |
| 7,213,478 B2 | 5/2007 | Harada et al. |
| 7,317,896 B1 * | 1/2008 | Saxena et al. ............... 455/41.2 |
| 7,346,344 B2 | 3/2008 | Fontaine |
| 7,382,771 B2 * | 6/2008 | Leblanc et al. ............... 370/352 |
| 7,400,903 B2 | 7/2008 | Shoemake et al. |
| 7,421,265 B1 * | 9/2008 | Liu ............................... 455/347 |
| 7,558,199 B1 | 7/2009 | Minei |
| 7,617,317 B2 | 11/2009 | Jones et al. |
| 7,620,065 B2 | 11/2009 | Falardeau |
| 7,675,862 B2 * | 3/2010 | Pham et al. .................. 370/241 |
| 7,764,784 B2 | 7/2010 | Sewall |
| 7,813,314 B2 | 10/2010 | Fulknier et al. |
| 8,046,000 B2 | 10/2011 | Sylvain |
| 8,077,681 B2 | 12/2011 | Ahmavaara |
| 8,090,807 B2 | 1/2012 | Chung et al. |
| 8,126,145 B1 * | 2/2012 | Tewari et al. ................. 380/255 |
| 2001/0039580 A1 | 11/2001 | Walker et al. |
| 2001/0042215 A1 | 11/2001 | Sullivan et al. |
| 2001/0046870 A1 | 11/2001 | Stilp et al. |
| 2001/0048683 A1 | 12/2001 | Allen |
| 2002/0025832 A1 | 2/2002 | Durian et al. |
| 2002/0062372 A1 | 5/2002 | Hong et al. |
| 2002/0118663 A1 * | 8/2002 | Dorenbosch et al. ......... 370/338 |
| 2003/0037165 A1 | 2/2003 | Shinomiya |
| 2003/0043755 A1 | 3/2003 | Mitchel |
| 2003/0045295 A1 | 3/2003 | Stanforth |
| 2003/0046396 A1 | 3/2003 | Richter et al. |
| 2003/0059005 A1 | 3/2003 | Meyerson et al. |
| 2003/0126252 A1 | 7/2003 | Abir |
| 2003/0200308 A1 | 10/2003 | Tameda et al. |
| 2003/0212800 A1 | 11/2003 | Jones et al. |
| 2003/0235175 A1 | 12/2003 | Naghian et al. |
| 2004/0003071 A1 | 1/2004 | Mathew et al. |
| 2004/0038697 A1 | 2/2004 | Attar et al. |
| 2004/0049576 A1 | 3/2004 | Schweitzer et al. |
| 2004/0068502 A1 | 4/2004 | Vogedes |
| 2004/0110544 A1 | 6/2004 | Oyagi et al. |
| 2004/0133689 A1 | 7/2004 | Vasisht |
| 2004/0133793 A1 | 7/2004 | Ginter et al. |
| 2004/0139170 A1 | 7/2004 | Shen et al. |
| 2004/0152449 A1 | 8/2004 | Koshihara |
| 2004/0153676 A1 | 8/2004 | Krantz et al. |
| 2004/0185876 A1 | 9/2004 | Gorenendaal et al. |
| 2004/0205154 A1 | 10/2004 | Dalton et al. |
| 2004/0205155 A1 | 10/2004 | Nobakht et al. |
| 2004/0218544 A1 * | 11/2004 | Lee ............................... 370/252 |
| 2004/0250136 A1 | 12/2004 | Albertine Trappeniers et al. |
| 2005/0008017 A1 | 1/2005 | Datta et al. |
| 2005/0014525 A1 | 1/2005 | Tsunehara et al. |
| 2005/0022013 A1 | 1/2005 | Schwenk |
| 2005/0038905 A1 | 2/2005 | Banes et al. |
| 2005/0044235 A1 | 2/2005 | Balahura |
| 2005/0047326 A1 | 3/2005 | Puon et al. |
| 2005/0086346 A1 | 4/2005 | Meyer |
| 2005/0101340 A1 | 5/2005 | Archiable |
| 2005/0108573 A1 | 5/2005 | Bennett et al. |
| 2005/0198234 A1 | 9/2005 | Leib et al. |
| 2005/0198319 A1 | 9/2005 | Chan et al. |
| 2005/0221850 A1 | 10/2005 | Kashiwase |
| 2005/0233728 A1 | 10/2005 | Karaoguz et al. |
| 2005/0245233 A1 | 11/2005 | Anderson |
| 2005/0246434 A1 | 11/2005 | Bantz et al. |
| 2005/0259645 A1 | 11/2005 | Chen et al. |
| 2005/0259654 A1 | 11/2005 | Faulk, Jr. |
| 2005/0262248 A1 | 11/2005 | Jennings III et al. |
| 2005/0267965 A1 | 12/2005 | Heller |
| 2006/0047823 A1 | 3/2006 | Cheng |
| 2006/0053290 A1 | 3/2006 | Randle |
| 2006/0072474 A1 | 4/2006 | Mitchell |
| 2006/0077607 A1 | 4/2006 | Hendricks et al. |
| 2006/0133582 A1 | 6/2006 | McCulloch |
| 2006/0153216 A1 | 7/2006 | Hosein et al. |
| 2006/0171402 A1 | 8/2006 | Moore et al. |
| 2006/0184670 A1 | 8/2006 | Beeson et al. |
| 2006/0187890 A1 * | 8/2006 | Lin ............................... 370/338 |
| 2007/0002846 A1 | 1/2007 | Rada et al. |
| 2007/0030857 A1 * | 2/2007 | Fulknier et al. ............... 370/401 |
| 2007/0081469 A1 | 4/2007 | Tracy et al. |
| 2007/0083606 A1 | 4/2007 | Malik et al. |
| 2007/0147324 A1 | 6/2007 | McGary |
| 2007/0153689 A1 | 7/2007 | Strub et al. |
| 2007/0177555 A1 | 8/2007 | Brueck |
| 2007/0233879 A1 | 10/2007 | Woods et al. |
| 2007/0254727 A1 | 11/2007 | Sewall |
| 2007/0255848 A1 | 11/2007 | Sewall |
| 2007/0291711 A1 * | 12/2007 | Welch et al. .................. 370/338 |
| 2008/0005108 A1 | 1/2008 | Ozzie et al. |
| 2008/0008165 A1 * | 1/2008 | Ikeda et al. .................. 370/360 |
| 2008/0039102 A1 | 2/2008 | Sewall |
| 2008/0043626 A1 * | 2/2008 | Pham et al. ................... 370/241 |
| 2008/0043673 A1 * | 2/2008 | Johnson et al. ............... 370/331 |
| 2008/0046561 A1 * | 2/2008 | Pham et al. ................... 709/224 |
| 2008/0049630 A1 | 2/2008 | Kozisek et al. |
| 2008/0056222 A1 * | 3/2008 | Waites .......................... 370/342 |
| 2008/0117860 A1 * | 5/2008 | Rodriguez et al. ............ 370/328 |
| 2008/0159167 A1 | 7/2008 | Ito et al. |
| 2008/0178172 A1 | 7/2008 | Dossa et al. |
| 2008/0250478 A1 * | 10/2008 | Miller et al. ...................... 726/5 |
| 2008/0259841 A1 * | 10/2008 | Deshpande ................... 370/328 |
| 2008/0267195 A1 * | 10/2008 | Belmon ......................... 370/401 |
| 2008/0310407 A1 | 12/2008 | Sewall |
| 2008/0313327 A1 | 12/2008 | Sewall et al. |
| 2009/0007096 A1 | 1/2009 | Chavez et al. |
| 2009/0015419 A1 | 1/2009 | Sewall |
| 2009/0030908 A1 | 1/2009 | Kawabe |
| 2009/0063667 A1 | 3/2009 | Smith et al. |
| 2009/0109959 A1 | 4/2009 | Elliott et al. |
| 2009/0129319 A1 | 5/2009 | Buddhikot et al. |
| 2009/0138447 A1 | 5/2009 | Kalavade |
| 2009/0147700 A1 | 6/2009 | Sewall |
| 2009/0168789 A1 | 7/2009 | Wood |
| 2009/0172658 A1 | 7/2009 | Wood |
| 2009/0172796 A1 | 7/2009 | Wood |
| 2009/0175285 A1 * | 7/2009 | Wood et al. ................... 370/402 |
| 2009/0180395 A1 * | 7/2009 | Wood et al. ................... 370/252 |
| 2009/0182845 A1 | 7/2009 | Johnson |
| 2009/0207003 A1 | 8/2009 | Brekke et al. |
| 2010/0014415 A1 * | 1/2010 | Moeller ......................... 370/216 |
| 2010/0118846 A1 * | 5/2010 | Moeller ......................... 370/338 |
| 2010/0202450 A1 | 8/2010 | Ansari et al. |
| 2010/0231790 A1 | 9/2010 | Ansari et al. |
| 2011/0051703 A1 * | 3/2011 | Fulknier et al. ............... 370/338 |
| 2011/0167157 A1 | 7/2011 | Virgilio et al. |
| 2011/0199932 A1 | 8/2011 | Short et al. |

OTHER PUBLICATIONS

International Search Report & Written Opinion of the International Searching Authority for Application No. PCT/US07/62077, mailed Nov. 20, 2007.

International Search Report & Written Opinion of the International Searching Authority for Application No. PCT/US07/62078, mailed Mar. 5, 2007.

International Search Report and Written Opinion of the International Searching Authority for Application No. PCT/US2008/076836, mailed Mar. 6, 2009.

USPTO, "Final Office Action in U.S. Appl. No. 10/936,124.", Feb. 2, 2007.

USPTO, "Final Office Action in U.S. Appl. No. 10/936,124.", Feb. 9, 2009.

(56) References Cited

OTHER PUBLICATIONS

USPTO, "Final Office Action in U.S. Appl. No. 10/936,124.", Jul. 11, 2007.
USPTO, "Final Office Action in U.S. Appl. No. 10/936,124.", Sep. 3, 2009.
USPTO, "Office Action in U.S. Appl. No. 10/936,124.", Apr. 10, 2008.
USPTO, "Office Action in U.S. Appl. No. 10/936,124.", Jun. 26, 2006.
Webster's, "Router", Aug. 28, 2009, Publisher: Webster's New World Telcom Dictionary 2009, Your Dictionary, www.yourdictionary.com/telecom/router.
USPTO, "Final Office Action in U.S. Appl. No. 11/673,965.", Apr. 1, 2010.
USPTO, "Office Action in U.S. Appl. No. 11/673,965.", Sep. 2, 2009.
USPTO, "Advisory Action in U.S. Appl. No. 11/376,973", Mar. 19, 2010.
R. Elz, R. Bush, "RFC 2181 Clarifications to the DNS Specification, Internet Engineering Task Force, http://tools.ietf.org/html/rfc2181, 1 page", Jul. 1997.
P. Vixie, S. Thomson, Y. Rekhter, J. Bound, "RFC 2136 Dynamic Updates in the Domain Name System (DNS Update), Internet Engineering Task Force, 51 pages.", Apr. 1997.
USPTO, "Final Office Action in U.S. Appl. No. 11/673,973.", Dec. 10, 2009.
USPTO, "Office Action in U.S. Appl. No. 11/673,973.", May 28, 2009.
Wikipedia, "Proxy Server, http://en.wikipedia.org/wiki/Proxy_server ; 9 pages,", Apr. 12, 2010.
USPTO, "Final Office Action in U.S. Appl. No. 11/673,956.", Apr. 15, 2010.
USPTO, "Office Action in U.S. Appl. No. 11/673,956.", Sep. 2, 2009.
USPTO, "Office Action in U.S. Appl. No. 12/172,885.", Apr. 26, 2010.
USPTO, "Office Action in U.S. Appl. No. 12/350,407.", Apr. 5, 2010.
PCT, "International Search Report and Written Opinion of the International Searching Authority for Application No. PCT/US2008/083409,", May 12, 2009.
USPTO, "Office Action in U.S. Appl. No. 11/673,973", mailed Sep. 24, 2010.
USPTO, "Office Action in U.S. Appl. No. 11/673,956 dated Dec. 22, 2010".
USPTO, "Final Office in U.S. Appl. No. 12/172,885 dated Nov. 2, 2010".
In Motion Technology—Take Your Business on the Road—Mobile Hotspot, "In Motion Technology, Inc. Introduces Industry's First 3G Hotspot for Passenger Productivity.", Jul. 31, 2003, Publisher: http://www.inmotiontechnology.com/newsevents/carey.html.
Mikrotik, "MikroTik Router OS V28 Reference Manual", 2005.
Peng, Dar-Tzen; Shin, K.G.; Abdelzaher, T.F., "Assignment and scheduling communicating periodic tasks in distributed real-time systems", Dec. 1997, Publisher: Software Engineering, IEEE Transactions on, vol. 23, No. 12, pp. 745-758, Dec. 1997.
USPTO, "Office Action in U.S. Appl. No. 12/270,419 dated Dec. 17, 2010".
USPTO, Final Office Action in U.S. Appl. No. 12/350,407 dated Dec. 14, 2010.
USPTO, "Office Action in U.S. Appl. No. 11/673,965 dated Feb. 15, 2011".
US Patent and Trademark Office, Final Office Action, U.S. Appl. No. 11/673,965, dated Aug. 4, 2011.
US Patent and Trademark Office, Office Action, U.S. Appl. No. 11/673,956, dated Aug. 10, 2011.
US Patent and Trademark Office, Office Action, U.S. Appl. No. 12/350,407, dated Jul. 6, 2011.
US Patent and Trademark Office, Final Office Action, U.S. Appl. No. 12/270,419, dated Jul. 11, 2011.
US Patent and Trademark Office, Final Office Action, U.S. Appl. No. 12/270,419, dated Jul. 22, 2011.
US Patent and Trademark Office, Final Office Action, U.S. Appl. No. 12/350,407, dated Jul. 6, 2011.
US Patent and Trademark Office, Office Action, U.S. Appl. No. 12/350,405, dated Feb. 16, 2012.
US Patent and Trademark Office, Final Office Action dated Mar. 15, 2012 for U.S. Appl. No. 12/843,541.
US Patent and Trademark Office, Office Action, U.S. Appl. No. 12/350,402, dated Apr. 16, 2012.
US Patent and Trademark Office, Office Action for U.S. Appl. No. 12/351,502 dated Apr. 25, 2012.
Router; http://www.yourdictionary.com/telecom/router; Aug. 28, 2009.
US Patent and Trademark Office, Office Action for U.S. Appl. No. 12/843,541 dated Jul. 18, 2012.
US Patent and Trademark Office; Office Action for U.S. Appl. No. 12/270,419 dated Mar. 27, 2012.
US Patent and Trademark Office, Final Office Action for U.S. Appl. No. 12/350,407 dated Jan. 3, 2012.
US Patent and Trademark Office, Office Action dated Jun. 6, 2013 in U.S. Appl. No. 12/350,405.
US Patent and Trademark Office, Office Action dated Aug. 21, 2012 in U.S. Appl. No. 12/350,407.
US Patent and Trademark Office, Office Action dated Sep. 12, 2012 in U.S. Appl. No. 12/350,460.
US Patent and Trademark Office, Final Office Action dated Apr. 10, 2013 in U.S. Appl. No. 12/351,502.

* cited by examiner

INITIATING ROUTER FUNCTIONS

CROSS REFERENCE TO RELATED APPLICATIONS

This application claims the priority of provisional applications 60/949,582 entitled "Initiating Router Functions" and 60/949,585 entitled "Alternative Use of Router Indicator Lights" both filed Jul. 13, 2007 and each of which is hereby incorporated by reference. This application is also a continuation in part of application Ser. No. 11/673,956 entitled "Hotspot Communication Limiter" filed Feb. 12, 2007 which is incorporated herein by reference.

BACKGROUND

Computers and other devices are linked in a local data network (LAN) by a router. That router also enables those devices to communicate over a wide area data network (WAN) such as the internet. The LAN may be wired, wireless, or some combination of wired and wireless. The WAN connection may be wired or wireless. Examples of wireless WANs include, but are not limited to cellular data networks and IEEE 802.16 data networks.

Router configuration is generally accomplished using a computer interacting with the router. The router includes an embedded web server that allows a user to access one or more configuration pages with a standard web browser. For example, the user may be able to change the security parameters, change passwords or perform any other configuration of the router's functions. These web pages may provide status information about the configuration of the router, the current network traffic patterns, the speed of the network and so forth. The pages may also allow the user to initiate or otherwise allow local network connections between the router and various client devices. If the router is configured to communicate over a wireless WAN, the user may use the pages to instruct the cellular router to initiate the wireless WAN connection with a cellular data network.

A web interface serves many users well. However, it would prove advantageous if certain router functions, especially those unique to capable of wiles WAN communications, could be initiated from the router itself without requiring a user interface provided through second device on the network.

DETAILED DESCRIPTION

Introduction: Various embodiments described below integrate user controls in a router's enclosure. Activation of each user control causes the router to instigate an action. Such actions can include connecting to or or disconnecting from a wireless WAN, allowing or disallowing LAN connections, and causing the router to communicate configuration or state information to the user.

Figure 1:
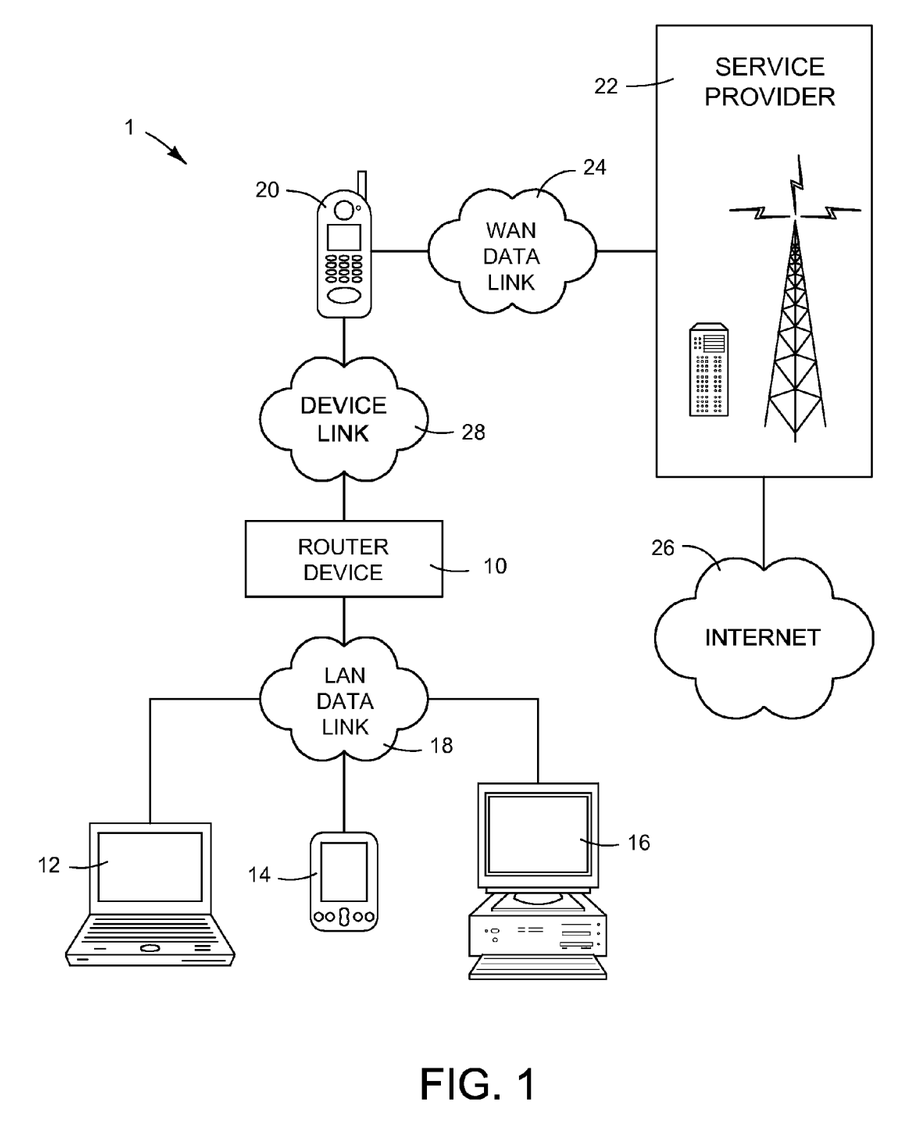
FIGS. 1 and 2 illustrate an exemplary block diagrams of environments in which embodiments of the present invention may be implemented.

Environment: FIG. 1 illustrates exemplary environment 1 in which various embodiments of the present invention may be implemented. Environment 10 includes router device 10 and clients 12, 14, and 16 and LAN data link 18. Router device 10, discussed in more detail later, represents generally a device capable or routing network communications between clients 12, 14, and 16 and internet 26 via a data exchanger 20. Clients 12, 14, and 16 represent generally any computing devices capable of communicating with router device 10.

LAN data link 18 interconnects router device 10 and clients 12, 14, 16. LAN data link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchanger 20 and service provider 22. Data exchanger 20 represents generally any combination of hardware and programming that can be utilized by router device 10 to connect to a wide area network such as the internet. While illustrated as an internet enabled cellular telephone, data exchanger 20 is not so limited. For example, data exchanger 20 may be a PCMCIA card or other device capable of wireless WAN communication. Such wireless WAN communication may comply with one or more of any number of protocols such as IEEE 802.16 and those employed in cellular data networks. Other examples for data exchanger 20 include but are not limited to DSL modems and cable modems.

Service provider 22 represents generally any infrastructure configured to provide internet related data services to subscribers such as an owner of data exchanger 20. For example, where data exchanger 20 is capable of wireless WAN communication, service provider 22 may be a telephone service provider capable of providing voice and data services to subscribers allowing access to internet 26. Wireless data communications may be accomplished using any number of possible protocols such as UMTS, GPRS, CDMA2000, GSM, CDPD, 3G, and IEEE 802.16. Where data exchanger 22 is a DSL or cable modem configured for wired WAN communication, service provider 22 may be a more traditional internet service provider (ISP) providing data access to internet 26.

WAN data link 24 serves as a common communications link through which communications are routed between internet 26 and clients 12, 14, and 16. WAN data link 24 interconnects data exchanger 20 and service provider 22 and represents generally any combination of a cable, wireless, or remote connection via a telecommunication link, an infrared link, a radio frequency link, or any other connector or system that provides electronic communication between data exchanger 20 and service provider 22.

In the embodiment illustrated in environment 1, device link 28 interconnects router device 10 and data exchanger 20. Device link 28 represents generally any combination of a cable, wireless, or remote connection via a telecommunication link, an infrared link, a radio frequency link, or any other connector or system that provides electronic communication between devices 10 and 20. As examples, device link 28 may incorporate a physical USB connection or radio waves carrying Bluetooth communications.

Communication between clients 12, 14, and 16 and internet 26 is dependent upon router device 10. Router device 10, as discussed below with respect to FIGS. 3-5, includes an integrated user interface that allows a user to directly modify a router state without being dependent upon a web interface.

While FIG. 1 shows router device 10 in communication with a single data exchanger 20, router device 10 may be configured to utilize multiple data exchangers of various types each capable of establishing a different WAN data link. For example, router device 10 may include multiple physical and wireless ports of various types with each port being configured to link router device 10 to a different type of data exchanger. For example, some data exchangers may be configured to utilize a router's USB and fire wire ports while others are configured to use a router's card slot. Others can be capable of wireless interaction with router device 10.

Figure 2:
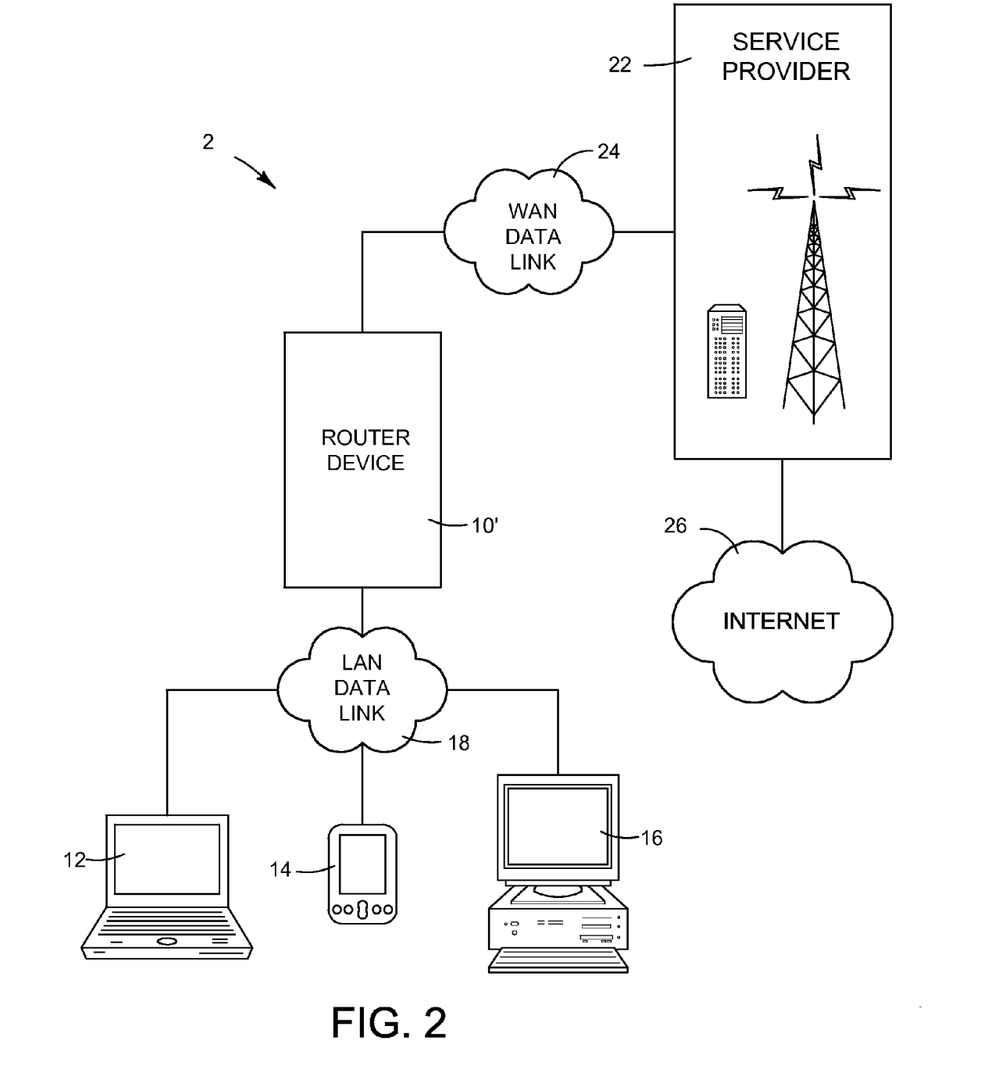

FIG. 2 illustrates another exemplary environment 2 in which various embodiments of the present invention may be implemented. In the example of FIG. 2, data exchanger 20 (not shown) and router device 10 are incorporated within the same device. Device link 32 (shown in FIG. 1) is eliminated and replaced with internal connections. In such a scenario, data exchanger may take the form of a card or any other device that can be inserted into a slot or otherwise coupled to router device 10. Alternatively, data exchanger 20 may be fully integrated into router device 10.

Figure 3:
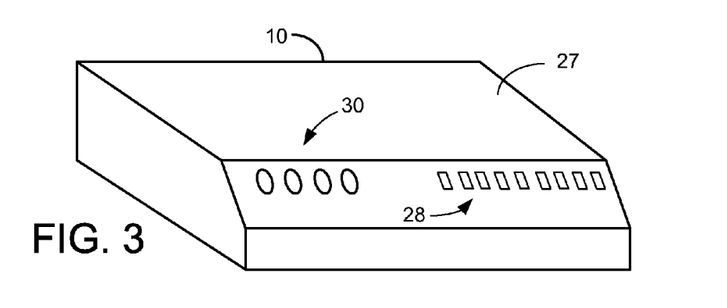
FIGS. 3-5 and 6A, 6B, 7A, 7B, and 8A-8D are diagrams showing physical and logical components of a router device according to an embodiment of the present invention.

Router Device: FIG. 3 is a sample illustration of the exterior of router device 10. In this example, router device 10 includes an enclosure 27 that encases internal circuitry. Enclosure 27 provides a user interface that includes one or more visual indicators 28 and user controls 30. While shown as a row of lights, visual indicator 28 represent generally any device or devices that can be used to communicate information visually to a user. An LCD display screen is one such example. While controls 30 are shown as buttons that can be activated when pressed by a user, controls 30 can be any component type that can provide a detectable response when activated by a user. Such a response may be the opening or closing of a circuit. The user interface may also include other components such as an audible indicator capable of communicating information audibly and a tactile indicator capable of communicating through touch or feel.

Figure 4:
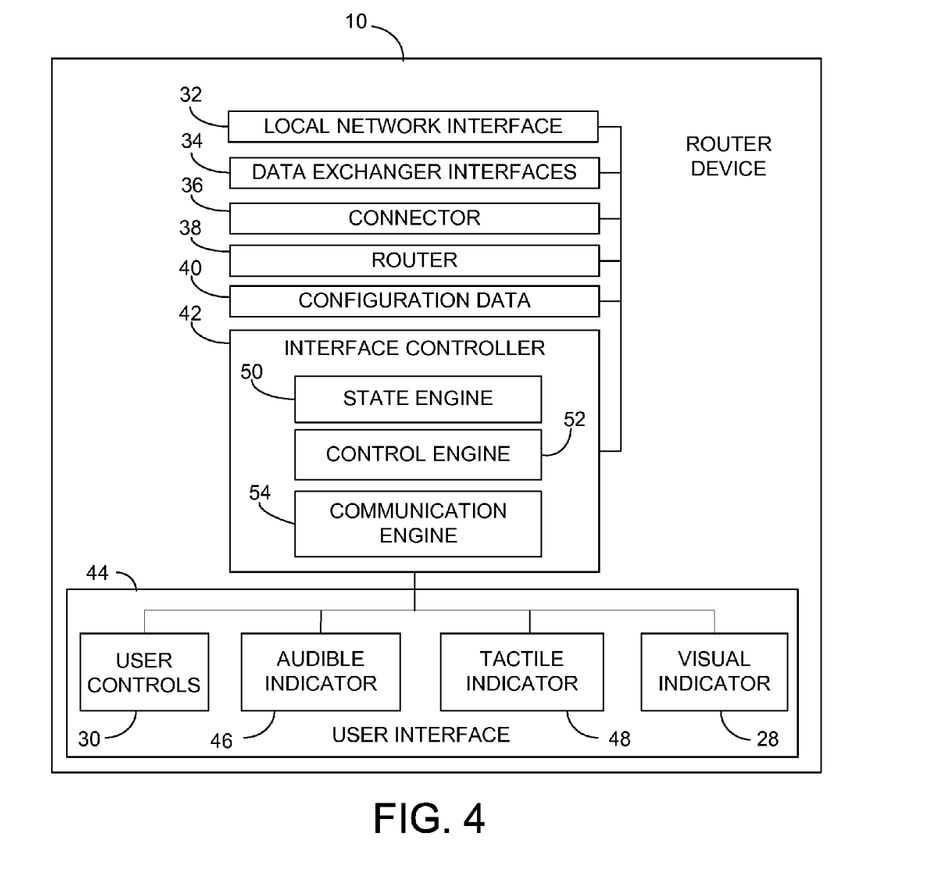

FIG. 4 is a block diagram illustrating physical and logical components of router device 10. As described above, router device 10 represents generally any combination of hardware and/programming capable of directing network communications between clients and the internet via a data exchanger such capable of wired or wireless WAN communication.

In the example of FIG. 4 router device 10 includes local network interface 32 and data exchanger interfaces 34. Local network interface 32 represents generally any combination of hardware and/or program instructions capable of supplying a communication interface between router device 10 and clients 12, 14, and 16 shown in FIGS. 1 and 2. Each data exchanger interface 34 represents any combination of hardware and/or programming enabling data to be communicated between router device 10 and a particular data exchanger such as data exchanger 20 shown in FIG. 1. For example, one or more of interfaces 34 may include a transceiver operable to exchange network communications utilizing a wireless protocol such as ultrawideband (UWB), Bluetooth, or 802.11. One or more of interfaces 34 may include physical ports or other physical connection points enabling wired communication. It is also noted that local network interface 32 may include both wired and wireless interfaces. The wireless interface, may for example, be an interface utilizing the Bluetooth protocol or some other wireless protocol. The wired interface may, for example, a series of ports physical ports such as card slots, and USB and fire wire ports.

Router device 10 also includes connector 36, router 38, configuration data 40, interface controller 42, and user interface 44. Connector 36 represents generally any combination of hardware and/or programming for sending a signal to selected one of any number of data exchangers available to router device 10 to establish a WAN data link. For example, where a given data exchanger is a data capable cellular device, connector 36 may send a signal causing the data capable cellular device to establish a wireless WAN data link with a cellular data service provider.

Router 38 represents generally any combination of hardware and/or programming for routing network communication received through network interface 32 to be transmitted by data exchanger 20 to internet 26. Router 38 is also responsible for routing inbound network communications received from internet 26 and directed via network interface 32 to a specified client 12, 14, or 16. Outbound and inbound network communications, for example can be an IP (internet Protocol) packets directed to a target on internet 26 or to a particular network device 12, 14, or 16 on a local area network.

Configuration data 40 represents a collection of data corresponding to various state settings of router device. It is noted that configuration data 40 is stored in one or more suitable memory devices provided by or accessible to router device 10. For example, configuration data 40 can include information accessible connector 36 that identifies which, if any, of a number of available data exchangers is to be used to establish a WAN data link. Configuration data 40 can include information identifying users that are authenticated to access a Wi-Fi connection supplied by local network interface 32. Configuration data 40 can include information identifying whether that Wi-Fi communication is to be turned off and whether or not anonymous Wi-Fi users are allowed. Configuration data 40 can include information available to router 38 that identifies a maximum data transfer rate. Of course, configuration data 40 can include other pieces of information.

Interface controller 42, described in more detail below, represents generally any combination of hardware and programming capable of monitoring various states of router device 10, detecting a user's activation of user controls 30, and utilizing indicator lights 28 to communicate various states of router device 10.

User interface 44 represents generally a combination of devices integrated into router device 10 that enable a user to provide instructions and receive communications. In the example of FIG. 4, router device 10 includes visual indicator 28, user controls 30, audible indicator 46, and tactile indicator 48. In general, user interface 44 need only include an indicator that is capable of communicating information to a user directly from router device 10 rather than through another device coupled to router device 10. As described above, user controls 30 can be any component type that can provide a response detectable by router device 10 when activated by a user. Visual indicator 28 represents generally any device or devices that can be used to communicate information visually to a user. Examples include LED lights and an LCD or other type of display screen. Audible indicator 46 represents generally any component capable of producing an audible signal that can be used to communicate information to a user. Tactile indicator 48 represents generally any component capable of producing a tactile response that can be used to communicate information to a user.

Interface controller 40 is shown to include state engine 50, control engine 52, and communication engine 54. State engine 50, represents generally any combination of hardware and programming capable of communicating with local network interface 32, data exchanger interfaces 34, connector 36, router 38, configuration data 40, and data exchanger 20 (FIG. 1) to monitor and control or otherwise modify various states of router device 10. Those states can include:

Power status—an indication of whether the router is on or off;

WAN status—an indication of currently operating WAN data link and its signal strength and an indication of other available WAN data links;

LAN—an indication of whether a particular physical LAN port is active;

Wi-Fi—an indication of whether the router is actively supporting a wireless local network and users accessing the local wireless network;

Modem—an indication of whether the router has a functioning connection with a data exchanger;

Transfer rate—an indication of a rate at which data is being transferred; and

Battery—an indication of an available power lever.

To monitor a given state, state engine 50 may poll configuration data 40. State engine 50 may also poll the particular component or components responsible or otherwise affected by that state. For example, to monitor signal strength, state engine 50 may poll data exchanger 20 for the information via data exchanger interface 36. To monitor the number of client devices accessing router device 10 via a wireless interface, state engine 50 may poll local network interface 32. To monitor the rate at which data is being transferred on data link 24, state engine 44 may poll router 38 and/or data exchanger 20. To monitor the power level, state engine 50 may poll power supply 42.

State engine 50 can modify the states of router device 10 in numerous manners. In some instances, state engine 50 may access and alter configuration data 40 and, thus, changing the behavior of other components accessing configuration data 40 in performance of their various tasks. In other instances, state engine 50 can provide corresponding instruction to a corresponding component of router device 10. In other words, state engine 50 can communicate instructions to a given component by communicating directly with that component.

As examples, state engine 50 may be instructed to activate or deactivate a local Wi-Fi communications or a selected WAN data link. In response state engine 50 appropriately alters configuration data 40 or communicates instructions to connector 36 to activate or deactivate a WAN data link or communicates with local network interface 32 to enable or disable a local Wi-Fi communications. State engine 50 may be instructed to activate a particular one of a number of possible WAN data links. In response state engine 50 appropriately alters configuration data 40 or communicates instructions to connector 36 to activate the selected WAN data link. State engine 50 may be instructed to block a particular user or all anonymous users from accessing the local Wi-Fi link. In response, engine 50 appropriately alters configuration data 40 or communicates instructions to local network interface 32.

Control engine 52 represents generally any combination of hardware and programming capable of determining if a given user control 30 has in fact been activated 30. For example, when a user depresses a control 30, a circuit is closed or opened which is detected by control engine 46. Control engine 52 identifies the particular user control 30 by identifying the particular circuit that has been closed or opened. Control engine 52 may also be responsible for determining a manner in which a control or a series of controls have been activated. For example, control engine 52 may identify when a particular group of controls have been activated in a particular order or when a given control has been continuously or repeatedly activated for a predetermined time. Control engine 52 may also responsible for communicating data to state engine 50 and communication engine 54 indicating which control button or buttons have been activated as well as the manner and order of activation. As discussed below, communications from control engine 52 cause communication engine 54 to communicate information to a user and also cause state engine 50 to modify one or more states of router device 10.

Communication engine 54 represents generally any combination of hardware and programming capable utilizing visual indicator 28, audible indicator 46, and tactile indicator to communicate information to a user. The communicated information notifies the user of various states of router device 10 monitored by state engine 50. The communicated information also enables the user to make selections utilizing controls 30 that cause state engine 50 to modify a selected state or states of router device 10.

As described above, router device 10 has the ability to communicate via a WAN data link. The state information communicated to the user by communication engine 54 can include a notification of whether or not the WAN data link is active. Through user controls 30, the user can then cause state engine 50 to activate or deactivate that WAN data link. Additionally, router device 10 may be capable of connecting to various types of data exchangers 20 via a number of various data exchanger interfaces 34. As a result, router device 10 has the ability to communicate via a number of different WAN data links. As such the state information communicated to the user by communication engine can include a notification of the each WAN data links that can be activated or deactivate. Through user controls 30, the user can then cause state engine 50 to activate or deactivate a selected WAN data link.

The state information communicated to the user by communication engine 54 can include a notification of whether or not Wi-Fi communications are enabled as well as the type of Wi-Fi communications that are allowed. For example, Wi-Fi users may be required to have an account or anonymous access may be allowed. Through user controls 30, the user can then cause state engine 50 to enable or disable Wi-Fi communications and change the type of allowed Wi-Fi communication.

The state information communicated to the user by communication engine 54 can include a notification of the number of Wi-Fi users as well as listing of current Wi-Fi users. Through user controls 30, the user can then cause state engine 50 to allow or block a particular Wi-Fi user. The state information communicated to the user by communication engine 54 can include a notification of a data transfer rate. This may include a current transfer rate as well as a maximum data transfer rate available to Wi-Fi users. Through user controls 30, the user can then cause state engine 50 to modify the available transfer rate.

Figure 5:
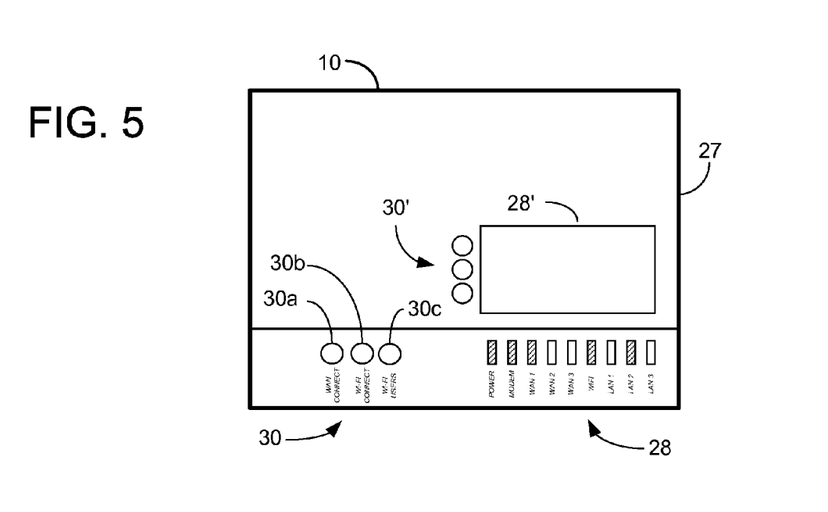

FIG. 5 illustrates an exemplary version of router device 10. In this example, enclosure 27 incorporates user controls 30 and 30' and visual indicators 28 and 28'. Visual indicator 28' is an LCD or other type of display screen. User controls 30 include WAN connect 30a, Wi-Fi connect 30b, and Wi-Fi Users 30c. As described below, activation of a given user control 30a, 30b, or 30c results in communication engine 54 utilizing visual indicator 28' to communicate one or more states of router device 10. Utilizing user controls 30', the user is able to provide instructions for modifying one or more of the communicated states.

Figure 6A:
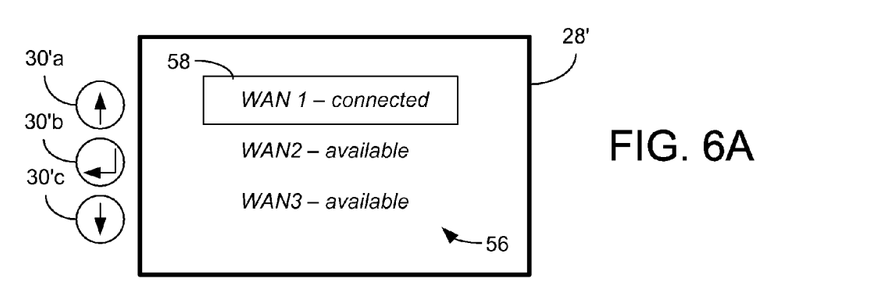

In FIG. 6A, user control 30a of FIG. 5 (WAN Connect) has been activated. As a result, communication engine 54 has caused visual indicator 28' to display page 56. User controls 30' are shown to include 30'a, 30'b and 30'c. User controls 30'a and 30'c are used to scroll up and down while user control 30'b is used to select highlighted information displayed in visual indicator 28'. Page 56 includes information for identifying and selecting a particular WAN data link. Depending upon the particular state of that WAN data link, the section may cause a connection to be made or it may cause a connection to be ended.

Figure 6B:
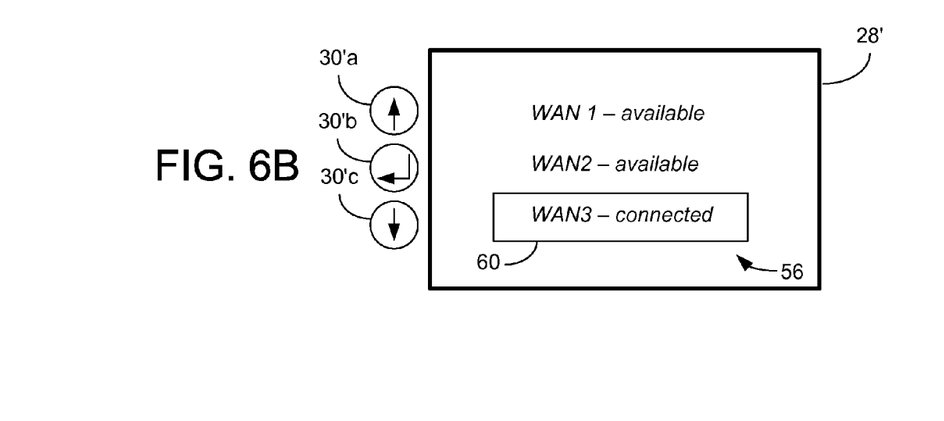

In FIG. 6A, WAN1 58, shown as connected, is highlighted. In FIG. 6B, a user has activated control 30'c to scroll page 56 and highlight WAN3 60. The user has also activated control 30'b to select WAN3 56. As a result, WAN3 is now shown as connected, while WAN1 has been disconnected and is shown as available. Referring back to FIG. 4, control engine 52 detects the activation of user controls 30'a, 30'b, and 30'c. In response, state engine 50 causes the WAN1 58 connection to be dropped and the WAN3 60 connection to be established.

Figure 7A:
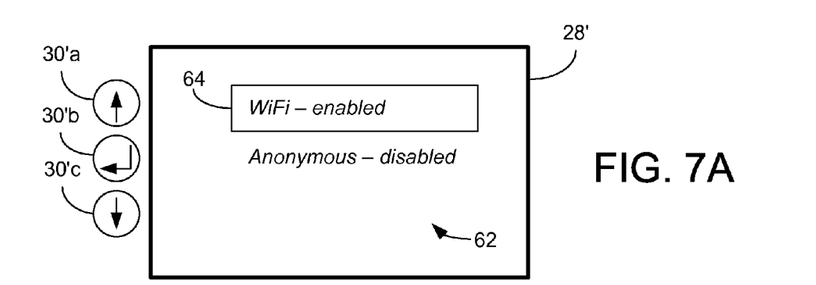

In FIG. 7A, user control 30b of FIG. 5 (Wi-Fi Connect) has been activated. As a result, communication engine 54 has caused visual indicator 28' to display page 62. Page 62 includes information for identifying and changing various states corresponding to the router's Wi-Fi communications. In this example, through page 62 a user can enable or disable the Wi-Fi link and enable or disable, the ability of anonymous Wi-Fi users to utilize router device 10.

Figure 7B:
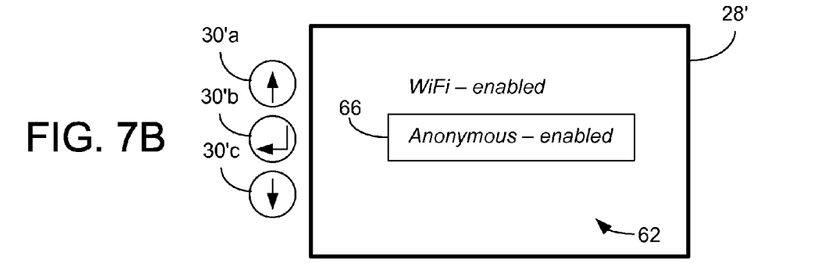

In FIG. 7A, Wi-Fi 64 has been highlighted. Selection of Wi-Fi 64 using control 30'b results in Wi-Fi communications to toggle between disabled to enabled. In FIG. 7B, selection of Anonymous 66 using control 30'b toggles anonymous usage between disabled to enabled. Referring back to FIG. 4, control engine 52 detects the activation of user controls 30'a, 30'b and 30'c. In response, state engine 50 causes enables or disables Wi-Fi communication and anonymous Wi-Fi access.

Figure 8A:
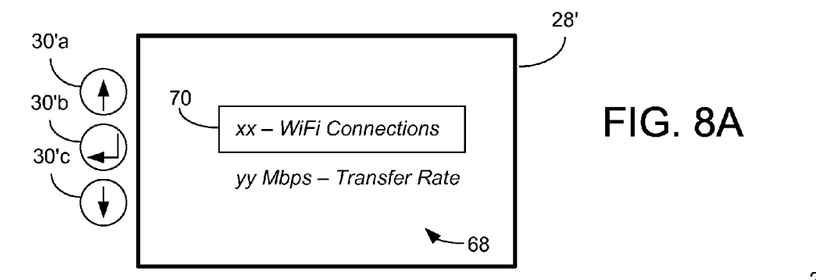

In FIG. 8A, user control 30c of FIG. 5 (Wi-Fi Users) has been activated. As a result, communication engine 54 has caused visual indicator 28' to display page 68. Page 68 includes information for identifying various states corresponding to the users of a router's Wi-Fi communications. In this example, page 68 communicates the number of current Wi-Fi users as well as a the current data transfer rate or bandwidth being consumed by those Wi-Fi users.

Figure 8B:
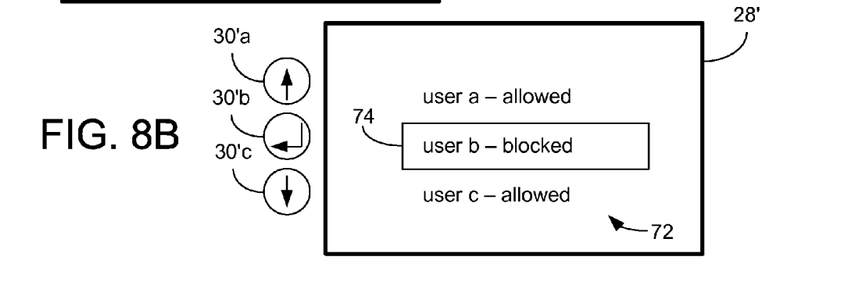

In FIG. 8A a user has activated control 30'b to select Wi-Fi connections 70 in page 68. As a result page 72 in FIG. 8B is displayed. Page 72 communicates a listing of Wi-Fi users as well as an indication of whether that user's Wi-Fi access is allowed or blocked. In FIG. 8B, the user has activated controls 30'a, 30'b, and 30'c to select user b 74. That selection results in blocking Wi-Fi access to user b.

Figure 8C:
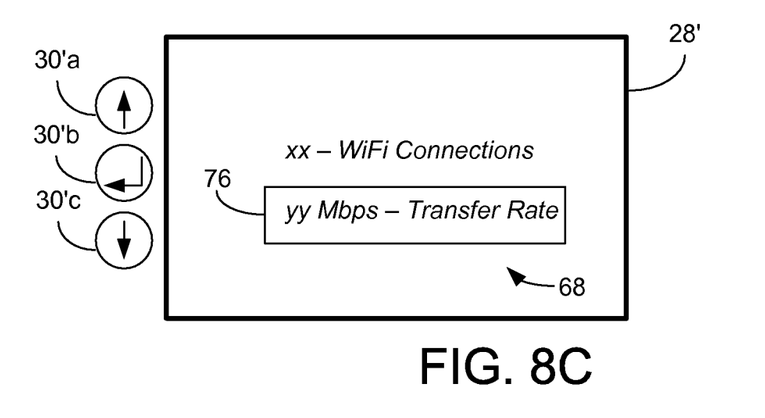
Figure 8D:
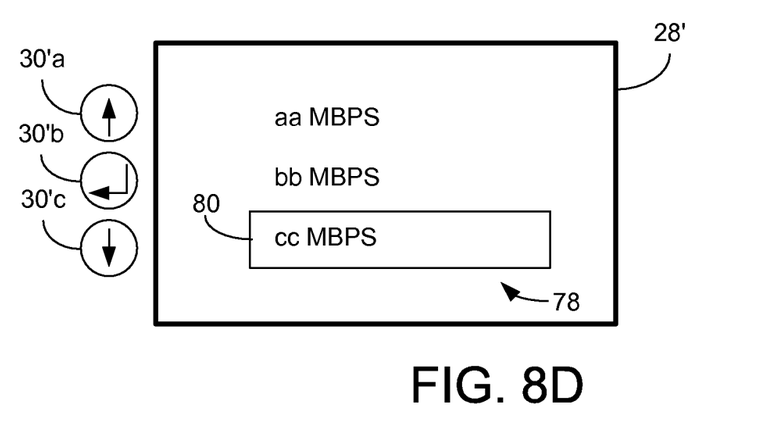

In FIG. 8C a user has activated control 30'b to select Transfer Rate 76 in page 68. As a result page 78 in FIG. 8D is displayed. Page 78 communicates a listing of selectable maximum transfer rates through which a user can set a bandwidth ceiling for Wi-Fi users. In FIG. 8D, the user has activated controls 30'a, 30'b, and 30'c to select cc MBPS 80.

Figure 9:
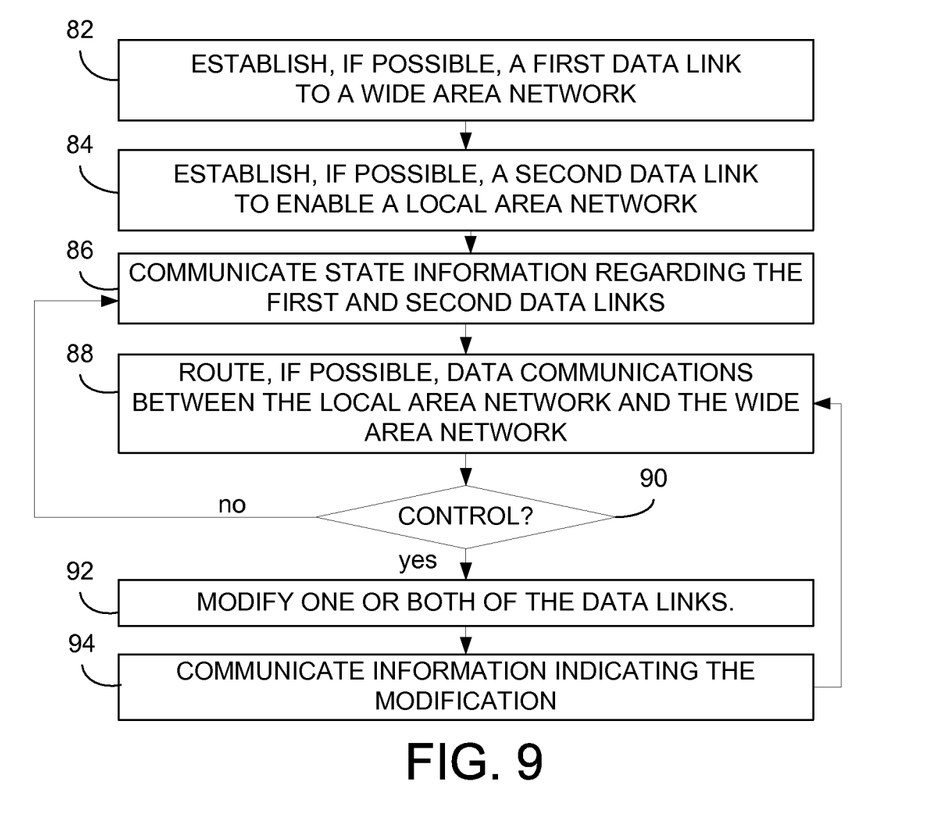
FIG. 9 is an exemplary flow diagram illustrating steps taken in performance of various embodiments of the present invention.

Operation: FIG. 9 is an exemplary flow diagram illustrating steps taken in performance of various embodiments. To route data communications between a plurality of clients and the internet, a router device, if possible, establishes or causes to be established a first data link to a wide area network (WAN data link) in step 82. The router device establishes, if possible, a second data link to a local area network (LAN data link) in step 84. Step 84, for example can include establishing one or more wired and wireless LAN data links between the router device and a plurality of client devices. State information regarding the first and second data links is communicated directly by the router device (step 86). Step 86 may be accomplished by interface controller 42 utilizing user interface 44 (FIG. 4). For example, step 86 may involve causing an indicator light to turn on or off, it may involve emitting a beep, or it may involve causing a buzzing. Step 86 may also involve causing information to be displayed in a visual indicator such as a display screen.

If the first and second data links are established, data communications may then be routed between the local area network and the wide area network (step 88). It is determined if a user control on the router device has been activated (step 90). If not, the process repeats with step 86. If a user control has been activated, one or both of the first and second data links are modified in accordance with the activation of the user control (step 92). As explained above, step 90 can involve selecting a connecting to or disconnecting a WAN data link. Where the router device is configured to a plurality of different data exchangers each capable of providing a different WAN data link, step 92 may include selecting a particular one of the possible WAN data links to connect to or disconnect from. Where the local area network wireless, step 92 could also involve enabling or disabling a Wi-Fi communications, setting a bandwidth limit, enabling anonymous use, and blocking individual users.

Information indicating the modification of Step 92 is then communicated by the router device (step 94). Step 94 may be accomplished by interface controller 42 utilizing user interface 44 (FIG. 4). For example, step 94 may involve causing an indicator light to turn on or off, it may involve emitting a beep, or it may involve causing a buzzing. Step 94 may also involve causing information to be displayed in a visual indicator such as a display screen. The process then repeats with step 88.

Conclusion: The schematic diagrams of FIGS. 1 and 2 illustrate exemplary environments in which embodiments of the present invention may be implemented. Implementation, however, is not limited to these environments. Embodiments may be implemented in any device having indicator lights. The diagrams of FIGS. 3-5, 6A-6B, 7A-7B, and 8A-8D show the architecture, functionality, and operation of various embodiments of the present invention. A number of the blocks are defined, at least in part, as programs or programming. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 9 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method of initiating router functions, comprising:
providing a router device having an integrated user interface having a user control and an indicator;
establishing, from the router device, a first data link to a wide area network;
establishing, from the router device, a second data link to enable a local area network;
communicating, via the indicator, state information regarding the first and second data links;
determining if the user control has been activated;
modifying at least the first data link or the second data link upon a determination that the user control has been activated, wherein modifying comprises enabling or disabling anonymous usage of wireless communication in the local area network;
communicating, via the indicator, information indicating the modification, wherein communicating comprises indicating the enabling or disabling of anonymous usage;
communicating, via the indicator, a list of users connected to the router device via the second data link and a current data transfer rate for each user on the list of users; and
modifying the first data link to set a maximum data transfer rate for each respective user on the list of users.

2. The method of claim 1, wherein:
modifying at least the first data link or the second data link upon a determination that the user control has been activated further comprises modifying the first data link by connecting to or disconnecting from the first data link; and
communicating, via the indicator, information indicating the modification includes communicating information indicating the disconnection.

3. The method of claim 1, wherein:
modifying at least the first data link or the second data link upon a determination that the user control has been activated further comprises disconnecting from the first data link and establishing, from the router device, a third data link to the wide area network, the first data link being different than the third data link; and
communicating, via the indicator, information indicating modification includes communicating information indicating the disconnection of the first data link and the establishment of the third data link.

4. The method of claim 1, wherein:
modifying at least the first data link or the second data link upon a determination that the user control has been activated further comprises enabling or disabling wireless communication for the local area network; and
communicating, via the indicator, information indicating the modification includes communicating information indicating the enabling or disabling of wireless communication.

5. The method of claim 1, wherein:
modifying at least the first data link or the second data link upon a determination that the user control has been activated further comprises blocking a particular user from accessing the local area network; and
communicating, via the indicator, information indicating the modification includes communicating information indicating the blocking of the particular user.

6. The method of claim 1, wherein:
modifying at least the first data link or the second data link upon a determination that the user control has been activated further comprises setting a maximum data transfer rate representing a bandwidth ceiling for the router device; and
communicating, via the indicator, information indicating the modification includes communicating information indicating the set maximum data transfer rate.

7. The method of claim 1, wherein the communicating state information occurs after the determining if the user control has been activated.

8. The method of claim 1, wherein the first data link is a wireless data link.

9. A non-transitory computer readable medium having computer executable instructions, the instructions being executable by a router device having an integrated user interface having a user control and an indicator, wherein the medium includes instructions for:
establishing, from the router device, a first data link to a wide area network;
establishing, from the router device, a second data link to enable a local area network;
communicating, via the indicator, state information regarding the first and second data links;
determining if the user control has been activated;
modifying at least the first data link or the second data link upon a determination that the user control has been activated, wherein modifying comprises enabling or disabling anonymous usage of wireless communication in the local area network;
communicating, via the indicator, information indicating the modification, wherein communicating comprises indicating the enabling or disabling of anonymous usage;
communicating, via the indicator, a list of users connected to the router device via the second data link and a current data transfer rate for each user on the list of users; and
modifying the first data link to set a maximum data transfer rate for each respective user on the list of users.

10. The medium of claim 9, wherein:
the instructions for modifying include instructions for modifying the first data link by connecting to or disconnecting from the first data link; and
the instructions for communicating, via the indicator, information indicating the modification include instructions for communicating information indicating the disconnection.

11. The medium of claim 9, wherein:
the instructions for modifying include instructions for disconnecting from the first data link and establishing, from the router device, a third data link to the wide area network, the first data link being different than the third data link; and
the instructions for communicating, via the indicator, information indicating modification include instructions for communicating information indicating the disconnection of the first data link and the establishment of the third data link.

12. The medium of claim 9, wherein:
the instructions for modifying include instructions for enabling or disabling wireless communication for the local area network; and
the instructions for communicating, via the indicator, information indicating the modification include instructions for communicating information indicating the enabling or disabling of wireless communication.

13. The medium of claim 9, wherein:
the instructions for modifying include instructions for blocking a particular user from accessing the local area network; and
the instructions for communicating, via the indicator, information indicating the modification include instructions for communicating information indicating the blocking of the particular user.

14. The medium of claim 9, wherein:
the instructions for modifying include instructions for setting a maximum data transfer rate representing a bandwidth ceiling for the router device; and
the instructions for communicating, via the indicator, information indicating the modification include instructions for communicating information indicating the set maximum data transfer rate.

15. The medium of claim 9, wherein the first data link is a wireless data link.

16. A device for routing communications between clients and the Internet comprising:
an integrated user interface having a user control and an indicator;
a connector configured to communicate with a first data exchanger to establish, from the router device, a first data link to a wide area network;
a local network interface configured to establish, from the router device, a second data link to enable a local area network;
a communication engine configured to communicate, via the indicator, state information regarding the first and second data links;
a control engine configured to determine if the user control has been activated;
a state engine operable to modify at least the first data link or the second data link upon a determination that the user control has been activated, wherein the state engine is configured to modify by enabling or disabling anonymous usage of wireless communication in the local area network;
the communication engine being configured to communicate, via the indicator, information indicating the modification, wherein the communication engine is configured to indicate the enabling or disabling of anonymous usage; and
wherein the communication engine is further configured to communicate, via the indicator, a list of users connected to the router device via the second data link and a current data transfer rate for each user on the list of users; and
the state engine is further configured to modify the first data link to set a maximum data transfer rate for each respective user on the list of users.

17. The device of claim 16, wherein:
the state engine is configured to modify by causing the router device to connect to or disconnecting from the first data link; and
the communication engine is configured to communicate, via the indicator, information indicating the disconnection.

18. The device of claim 16, wherein:
the state engine is configured to modify by causing the router device to disconnecting from the first data link and establishing, from the router device, a third data link to the wide area network, the first data link being different than the third data link; and
the communication engine is configured to communicate, via the indicator, information indicating the disconnection of the first data link and the establishment of the third data link.

19. The device of claim 16, wherein:
the state engine is configured to modify by enabling or disabling wireless communication for the local area network; and
the communication engine is configured to communicate, via the indicator, information indicating the enabling or disabling of wireless communication.

20. The device of claim 16, wherein:
the state engine is configured to modify by blocking a particular user from accessing the local area network; and
the communication engine is configured to communicate, via the indicator, information indicating the blocking of the particular user.

21. The device of claim 16, wherein:
the state engine is configured to modify by setting a maximum data transfer rate representing a bandwidth ceiling for the router device; and
the communication engine is configured to communicate, via the indicator, information indicating the set maximum data transfer rate.

22. The device of claim 16, wherein the first data link is a wireless data link.

23. A device for routing communications between clients and the Internet comprising:
an integrated user interface having a user control and an indicator;
means for establishing, from the router device, a first data link to a wide area network;
means for establishing, from the router device, a second data link to enable a local area network;
means for communicating, via the indicator, state information regarding the first and second data links;
means for determining if the user control has been activated;
means for modifying at least the first data link or the second data link upon a determination that the user control has been activated, wherein modifying comprises enabling or disabling anonymous usage of wireless communication in the local area network;
means for communicating, via the indicator, information indicating the modification, wherein communicating comprises indicating the enabling or disabling of anonymous usage;
means for communicating, via the indicator, a list of users connected to the router device via the second data link and a current data transfer rate for each user on the list of users; and
means for modifying the first data link to set a maximum data transfer rate for each respective user on the list of users.

24. The device of claim 23, wherein the first data link is a wireless data link.

25. A method of initiating router functions, comprising:
providing a router device having an integrated user interface having a user control and an indicator;

establishing, from the router device, a first wireless data link to a wide area network;

establishing, from the router device, a second data link to enable a local area network;

communicating, via the indicator, state information regarding the first and second data links;

determining if the user control has been activated;

modifying the first data link upon a determination that the user control has been activated, wherein the modifying comprises disconnecting from the first data link and establishing, from the router device, a third data link to the wide area network, the first data link being different than the third data link;

modifying the second data link upon a determination that the user control has been activated, wherein modifying comprises enabling or disabling anonymous usage of wireless communication in the local area network; and communicating, via the indicator, information indicating the modification of the first or second data link, wherein communicating comprises indicating the enabling or disabling of anonymous usage;

communicating, via the indicator, a list of users connected to the router device via the second data link and a current data transfer rate for each user on the list of users; and modifying the first data link to set a maximum data transfer rate for each respective user on the list of users.

* * * * *